United States Patent [19]

Sakaguchi et al.

[11] Patent Number: 4,558,798
[45] Date of Patent: Dec. 17, 1985

[54] FLUID RESERVOIR HAVING A SEAL AND COVER

[75] Inventors: Shozo Sakaguchi, Yoshimi; Kunio Yanagi, Higashimatsuyama, both of Japan

[73] Assignee: Jidosha Kiki Co. Ltd., Japan

[21] Appl. No.: 704,644

[22] Filed: Feb. 22, 1985

[30] Foreign Application Priority Data

Mar. 2, 1984 [JP] Japan .............................. 59-30496[U]
Mar. 2, 1984 [JP] Japan .............................. 59-30497[U]

[51] Int. Cl.$^4$ .............................................. B65D 41/04
[52] U.S. Cl. .................................. 220/256; 220/288; 220/304; 220/378
[58] Field of Search ................ 220/256, 288, 304, 378

[56] References Cited

U.S. PATENT DOCUMENTS 2,675,142 4/1954 Spayd .................................. 220/304
4,498,601 2/1985 Fort .................................... 220/256

Primary Examiner—George T. Hall
Attorney, Agent, or Firm—McGlew and Tuttle

[57] ABSTRACT

The present invention relates to a fluid reservoir unit designed for reserving a liquid such as brake oil and the like as applied in the field of hydraulic brake system, especially of such construction that there is provided a force ring adapted to engage in cooperation with the top surface of the circumferential edge of a diaphragm covering the opening at the top end of the reservoir body of cylindrical shape, the force ring being defined at its outer circumferential surface with a flanged portion having threads for the purpose that when installing the diaphragm and the force ring onto the cap to be threadedly engaged with the outer circumference of the top end of the reservoir body, the threads in the flanged portion is led to working position while engaging threadedly with the female threads defined in the inner circumferential surface of the cap, so that the flanged portion may be put to dwell loosely rotatably in the inside of the female threads.

3 Claims, 3 Drawing Figures

FLUID RESERVOIR HAVING A SEAL AND COVER

BACKGROUND OF THE INVENTION

1. Field of the Invention

The present invention relates generally to a fluid reservoir for the purpose of reserving a liquid, such as brake oil, etc. for use in the hydraulic brake system of an automotive vehicle or the like.

2. Description of the Prior Art

The typical construction of a fluid reservoir for reserving the operating liquid such as brake oil, etc. generally known in art of the hydraulic brake system is such that there are provided a cap over the opening at the top end of the reservoir body and a diaphragm disposed in the inside of the cap in such a manner that the moisture, dust or the like is efficiently prevented from entering into the reservoir body by function of the diaphragm. Referring more specifically to such a typical construction of the reservoir, it is noted that the circumferential portion of the diaphragm is adapted to be secured rigidly in position by way of the cap, but with such construction of the diaphragm to be secured directly by using the cap member, it is inevitable that the circumferential portion of the diaphragm is likely to be twisted followingly with the turning motion of the cap, when so rotated. In the attempt to prevent such trend of twisting motion of the diaphragm from occurring, therefore, it is generally constructed that there is further provided a force ring around the circumferential portion of the diaphragm and a step formed on the inner circumferential surface of the cap for operative engagement with the force ring in such fashion that the diaphragm may be caused to be urged into resting position at its circumferential portion by slidingly securing the engagement step on the cap along the force ring of the diaphragm, accordingly.

With the employment of such force ring, it would naturally make a job intricate as it would require added procedures when installing and removing the cap for the reservoir, and also, there is a fear that it would occasionally be forgotten to put the force ring back to position for use.

In this respect, it has then been proposed that there is formed an annular groove in the lower face of the force ring, with which the circumferential portion of the diaphragm is formed to engage together so that these two members may be assembled as a unit, and that there are provided a plurality of projections in the outer circumferential surface of the force ring and also a spiral groove in the female threads formed in the inner circumferential surface of the cap in such a manner that the force ring may resiliently be deformed manually slightly in the radial way and then forced into threaded engagement with the spiral groove of the female threads of the cap so that it may freely rotate with respect to the cap, whereby these diaphragm and cap can now be handled as a unit in practice. (see the Japanese Utility Model Laid-Open Application No. 14,765/1981).

With such construction of the reservoir, however, as it is generally inevitable to have the force ring deformed manually slightly prior to installation onto the cap as mentioned above, and therefore, it would be very possible that the diaphragm run out of engagement at its circumferential portion with the spiral groove of the force ring, when so deformed manually, and then this would occasionally make an installation job of the reservoir inefficient, after all.

SUMMARY OF THE INVENTION

The present invention is therefore materialized to practice in view of such circumstances as noted above and is essentially directed to the provision of an improved fluid reservoir construction, which can afford an efficient installation of the cap of the reservoir in which the diaphragm can be fit loosely into rotatable engagement relationship with the inside of the cap without the necessity of deforming the force ring fit around the circumferential portion of the diaphragm prior to installation.

According to the gist of the present invention relating to the reservoir construction wherein the opening at the top end of the reservoir body of cylindrical shape is covered with a diaphragm, and wherein a force ring is mounted on the upper surface of the circumferential portion of the diaphragm so that the circumferential portion of the diaphragm is rigidly secured by using the cap through the force ring, there is provided, as briefly summarized, an improved reservoir construction which is characterized in that, the lower surface of the force ring is formed with an annular groove so as to have the circumferential edge of the diaphragm engaged snugly with the annular groove, and a flanged portion defined in the outer circumference of the force ring, the flanged portion being formed with male threads adapted to threadedly engage with female threads formed in the inner circumferential surface of the cap in such a manner that the flanged portion of the force ring can be placed to dwell loosely rotatably in the inside of the female threads.

By virtue of such an advantageous construction, it is assured that the flanged portion of the force ring can now be fit loosely into a rotatable engagement relationship with respect to the female threads of the cap without the necessity of deforming the force ring in the installation work. With such advantageous feature in contrast to the conventional force ring, there is no fear that the circumferential portion of the diaphragm would run out of engagement with the annular groove of the force ring at all, and consequently, it is practicably possible that the installation work of the reservoir may be made so efficiently, accordingly.

The other objects, principle, property and details of the present invention will, as well as advantages thereof, become more apparent from the following detailed description by way of a preferred embodiment of the invention, when read in conjunction with the accompanying drawings.

DETAILED DESCRIPTION OF THE INVENTION

Figure 1:
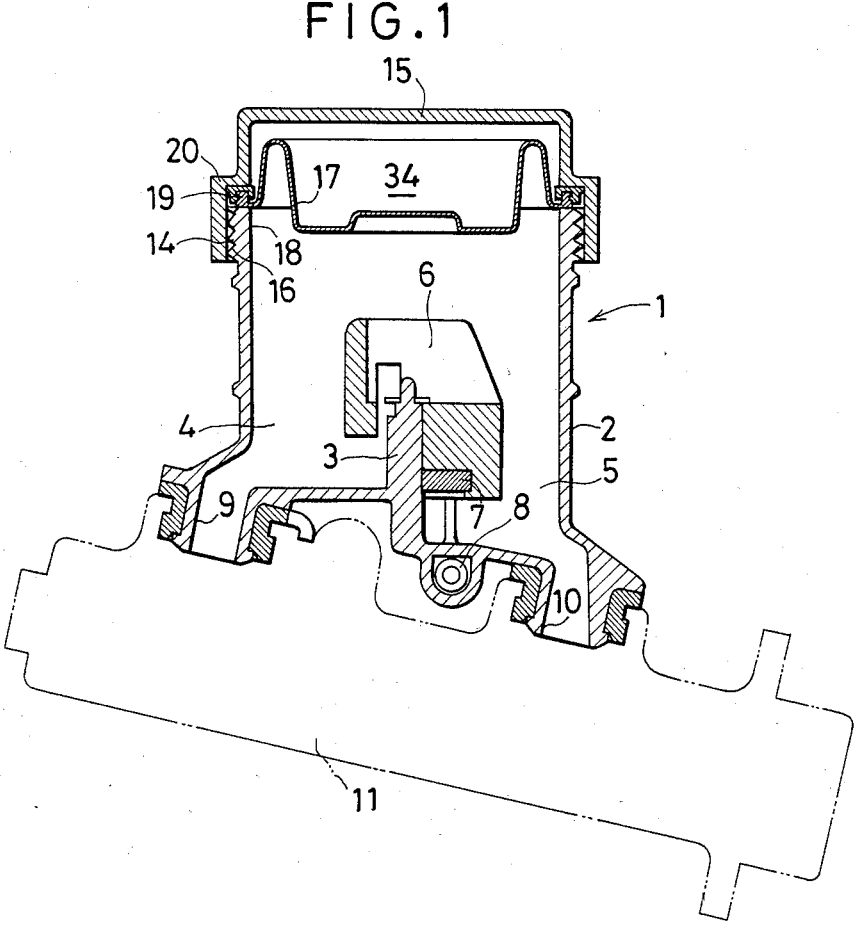
FIG. 1 is a longitudinal cross-sectional view showing the reservoir assembly.

The present invention will now be explained by way of a preferred embodiment thereof as adapted in practice to the tandem type master brake cylinder in reference to the drawings attached herewith. Now, referring to FIG. 1 showing the reservoir 1 in side elevation, the reference numeral 2 designates the body of the reservoir of cylindrical shape, 3 designates a partition wall for separating the lower inside portion of the reservoir body 2 into a fore chamber 4 and a rear chamber 5, 6 designates a float equipped with a magnet 7, 8 a switch for detecting a current fluid level at which it is turned ON by function of the magnet 7, and 9 and 10 openings connected to port not shown of a brake master cylinder 11, respectively.

It is seen that there is formed male threads 14 in the upper end outer circumferential surface of the reservoir body 2, and female threads 16 of a cap 15 resting in threaded engagement with the male threads 14. There is disposed a rubber diaphragm 17 in position in the inside of the cap 15, which is adapted to hermetically close an upper end opening 18 of the reservoir body 2.

Figure 2:
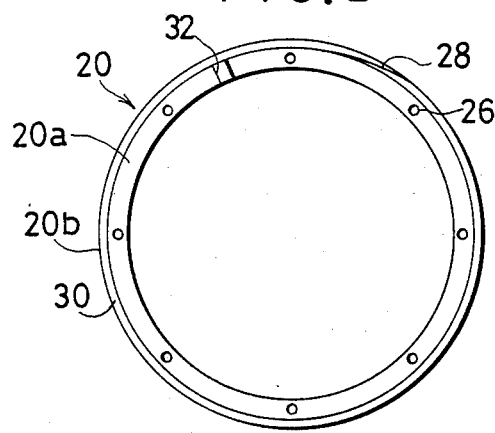
FIG. 2 is a plan view showing generally the force ring.

There is a force ring 20, which is formed integrally of a synthetic resin as generally shown in FIG. 2, fitted around the circumferential edge 19 of the diaphragm 17. As shown in detail in FIG. 3, there is formed an annular groove 21 in the lower surface of the force ring 20, into which annular groove there is press-fitted the circumferential edge 19 of the diaphragm 17.

In the inner wall 22 of the annular groove 21 at the radially outward position thereof, there is formed a ledge 23 of ring-like shape around the whole circumference of the inner wall 22 which serves as an engaging portion having the generally U-letter shape in cross section, and on the other hand, in the outer circumferential surface 24 of the circumferential edge 19 of the diaphragm 17, there is formed a recess of ring-like shape 25 along the entire circumference of the outer circumferential surface 24 serving as an engaging portion which can snugly fit with the ledge 23 noted above. By the mutual engagement between the ledge 23 and the recess 25, it is constructed that the force ring 20 does not run easily out of engagement with the circumferential edge 19 of the diaphragm 17, accordingly. In this manner, the mentioned engaging and engaged members can be put to be engaged with each other simply by forcing the circumferential edge of the diaphragm into engagement with the annular groove of the force ring, and as a consequence, the efficiency of the installation work of the reservoir can now be improved substantially. Also, as it is possible in practice to have the shapes of the annular groove of the force ring and the circumferential edge of the diaphragm so simple, the production cost of the metal molds for the force ring and the diaphragm can be cut short accordingly.

Figure 3:
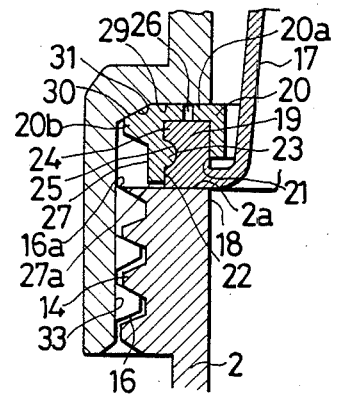
FIG. 3 is an enlarged fragmentary view showing, in cross section, the essential parts of FIG. 1.

Also, there are provided a plurality of escaping holes at an equal interval along the upper circumferential wall 20a of the force ring 20, as shown in FIG. 2 and FIG. 3, which are designed to let the air, entrapped in the annular groove 21 during the fitting operation of the circumferential edge 19 of the diaphragm 17 into the annular groove 21 of the force ring 20, escaped by way of these escaping holes 26. Consequently, the press-fitting work of the circumferential edge 19 into the annular groove 21 can be conducted quite smoothly.

In the outer circumferential wall 27 of the force ring 20, there is formed a flanged portion 20b which extends integrally from the upper surface 20a, as shown in FIG. 2 and FIG. 3. The outer diameter of the flanged portion 20b is made generally equal to that of the male threads 14 of the reservoir body 2, and its cross-sectional shape is formed to be generally triangular similar to that of the male threads 14. Also, there is formed a single-turn thread 28 in the outer circumference of the flanged portion 20b as shown in FIG. 2, so that the single-turn thread 28, can engage threadedly with the female threads 16 of the cap 15.

On the other hand, there is formed a ring-shaped urging step 29 in the inner circumferential wall of the cap 15 as shown in FIG. 3, which is adapted to urge the upper wall surface 20a of the force ring 20 while keeping sliding contact therewith. Also, there is formed an inclined urging surface 31 extending in the circumferential direction in the outer circumferential corner of this urging step 29, which is adapted to urge the tapered portion 30 as formed in the upper surface of the flanged portion 20b of the force ring 20 while keeping like sliding contact therewith.

Furthermore, in the upper surface 20a of the force ring 20 as viewed in FIG. 2, there is formed a slotted groove 32 for vent extending in the radial direction and also as shown in FIG. 2, there is formed a similar slotted groove 33 for vent extending in the vertical directions in the female threads 16 of the cap 15. It is arranged that a space 34 defined between the cap 15 and the diaphragm 17 is open to the atmosphere by way of these slotted grooves 32, 33.

With the general construction of the reservoir 1 of the brake master cylinder 11 as fully explained hereinbefore, the procedures of installation work of the cap 15 and the diaphragm 17 onto the reservoir body 2 is as follows; firstly, fitting by compression the circumferential edge 19 of the diaphragm 17 into the force ring 20, thereafter engaging threadedly the single-turn thread 28 of the force ring 20 with the female threads 16 of the cap 15 by manually turning the diaphragm 17.

Next, by turning the diaphragm 17 by specified times, the flanged portion 20b of the force ring 20 is loosely fitted in position between the end 16a of the female threads 16 and the urging step 29. With such procedures, the diaphragm 17 is held in right position to the cap 15 by way of the force ring 20, thus making it possible to handle the cap 15, the diaphragm 17 and the force ring 20 as a unit.

As the force ring 20 is designed to be of screw-in type as explained hereinbefore, it is not necessary to apply an excessive force when installing the ring into the cap 15. In this respect, therefore, there is no apprehension that that the circumferential edge 19 of the diaphragm 17 would run out of engagement with the annular groove 21 of the force ring 20 owing to its deformation when installing, at all.

Next, the cap 15 with the diaphragm 17 installed therein as noted above is then put in position onto the opening 18 at the top end of the reservoir body 2, thereafter turning manually the cap 15 to have the female threads 16 thereof engaged threadedly with the male threads 14 of the reservoir body 2. Then, by turning the cap 15 several times as specified, the cap 15 may be secured in position to the reservoir body 2, thus completing the installation work of the cap 15.

At this moment, as the circumferential edge 19 of the diaphragm 17 is positively urged downwardly by function of the urging step 29 of the cap 15 by way of the force ring 20, there is obtained a due hermetic sealing state of the top end opening 18, urging the circumferential edge 19 against the upper end surface 2a of the reservoir body 2. In this installating operation, by virtue of the advantageous feature such that the urging step 29 of the cap 15 functions to urge the upper surface 20a of the force ring 20 while keeping the sliding contact relationship therewith, there is no fear of an undesired excessive force rendered in the circumferential direction upon the circumferential edge 19 of the diaphragm 17, thus preventing damages or improper sealing owing to possible twisting or the like condition of the circumferential edge 19 from occurring, accordingly.

Also, it is arranged advantageously such that the inclined urging surface 31 of the cap 15 urges increasingly the tapered portion 30 of the force ring 20 with a certain angular relationship in their mutual contact as the cap 15 is screwed-in, even if the diaphragm 17 or the force ring 20 would possibly be located out of center or in an eccentric position with respect to the top end opening 18 of the reservoir body 2, the force ring 20 would then be caused to shift in the radial way as being guided by the inclined urging surface due to its centering function with the tapered portion 30, thus providing the effect of automatic centering of the diaphragm 17, accordingly. With such an advantageous arrangement, therefore, there is no fear that there would be caused an improper sealing in the circumferential edge 19 owing to a possible misalignment or eccentricity in positioning of the diaphragm 17 at all.

It is seen that in the state that the cap 15 is completely secured in position as shown in FIG. 3, the lower end 27a of the outer circumferential wall 27 of the force ring 20 is held slightly away from the upper end surface 2a of the reservoir body 2. More specifically, with the lower end 27a of the outer circumferential wall 27 held with a small gap, it is possible to have the securing force of the cap 15 rendered fully effectively all around the circumferential edge 19 of the diaphragm 17, and then there may be ensured with a positive sealing effect from this securing force between the circumferential edge 19 and the upper end surface 2a of the reservoir body 2, accordingly.

While the present invention was fully explained hereinbefore by way of the preferred embodiment thereof, it is to be understood that the present invention is not intended to be restricted to the details of the specific construction shown in the preferred embodiment, but to the contrary, many changes and modifications may be made in the foregoing teaching without any restriction thereto and without departing from the spirit and scope of the invention. For instance, it is notable that while there is provided the tapered portion 30 specifically to the upper side of the flanged portion 20b only in the embodiment noted herein, it may naturally be formed extending toward the upper surface 20a of the force ring 20, as well. It is of course possible in practice to have the urging step 29 of the cap 15 extending in continuation from the inclined urging surface 31 in such modification.

While the ledge portion 23 of the force ring 20 is defined in the inner surface 22 on the outer diametral position of the annular groove 21 by way of the preferred embodiment of the invention, it is also possible that the same may as well be formed in the inner surface on the inner diametral position thereto. It is of course possible that another recess 1 be likewise formed in corresponding relationship in the circumferential edge 19 of the diaphragm 17, accordingly. While there is formed the ledge portion 23 in the annular groove 21 and the recessed portion 25 in the circumferential edge 19 of the diaphragm 17, respectively, according to the preferred embodiment of the invention, it is of course possible to have them formed in the other way round.

It is also to be understood that the appended claims are intended to cover all of such generic and specific features particular to the invention as disclosed herein and all statements relating to the scope of the invention, which as a matter of language might be said to fall thereunder.

We claim:

1. A fluid reservoir including a diaphragm for closing hermetically an opening at the top end of the reservoir body of cylindrical shape, a force ring disposed upon the upper surface of the circumferential portion of the diaphragm, and a cap threadedly engaged with the outer circumference of the top end of the reservoir body, so as to have the circumferential edge of the diaphragm secured rigidly in position by using the cap through the force ring, which comprises, in combination, the lower surface of said force ring formed with an annular groove so as to have the circumferential edge of said diaphragm engaged snugly with said annular groove, and a flanged portion defined in the outer circumference of said force ring, said flanged portion being formed with male thread means adapted to threadedly engage with female thread means formed in the inner circumferential surface of said cap in such a manner that said flanged portion of said force ring can be placed to dwell loosely rotatably in the inside of said female thread means.

2. The fluid reservoir as claimed in claim 1, wherein the flanged portion of said force ring is formed in the upper side with a tapered portion of ring shape extending downwardly at a given angular relationship facing radially outwardly, and wherein said cap is defined in the inner circumferential surface with an inclined urging surface of ring shape adapted to urge in cooperative engagement with said tapered portion.

3. The fluid reservoir as claimed in claim 1 or claim 2, wherein there is formed an engaging portion of ring shape extending along the inner wall surface of said annular groove, and wherein there is formed an engaged portion extending along the circumferential edge of said diaphragm so as to engage mutually with said engaging portion.

* * * * *